United States Patent
Liu (10) Patent No.: US 9,621,292 B2
(45) Date of Patent: Apr. 11, 2017

(54) DETERMINISTIC SCHEDULING ALGORITHM FOR WIRELESS COMMUNICATION

(71) Applicant: Simmonds Precision Products, Inc., Vergennes, VT (US)

(72) Inventor: Lei Liu, Shelburne, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 189 days.

(21) Appl. No.: 14/271,517

(22) Filed: May 7, 2014

(65) Prior Publication Data
US 2015/0326333 A1 Nov. 12, 2015

(51) Int. Cl.
H04J 3/16 (2006.01)
H04B 7/26 (2006.01)
H04W 72/12 (2009.01)
H04W 72/04 (2009.01)

(52) U.S. Cl.
CPC .......... *H04J 3/1694* (2013.01); *H04B 7/2653* (2013.01); *H04W 72/121* (2013.01); *H04W 72/1242* (2013.01); *H04W 72/0446* (2013.01)

(58) Field of Classification Search
CPC ...... H04B 7/00; H04B 7/26; H04J 3/14; H04J 3/1694; H04L 12/5693; H04L 12/5695; H04W 72/04; H04W 72/12
See application file for complete search history.

(56) References Cited

U.S. PATENT DOCUMENTS

| | | | |
|---|---|---|---|
| 5,748,624 A | 5/1998 | Kondo | |
| 6,657,983 B1 | 12/2003 | Surazski et al. | |
| 7,187,665 B2 | 3/2007 | Nakamura | |
| 7,233,584 B2 | 6/2007 | Nguyen et al. | |
| 7,499,421 B2 | 3/2009 | Lee et al. | |
| 7,596,113 B1 | 9/2009 | Kingston et al. | |
| 7,768,992 B2 | 8/2010 | Pun | |
| 8,346,273 B2 | 1/2013 | Weigand | |
| 8,351,369 B2 | 1/2013 | Han et al. | |
| 2003/0031193 A1 | 2/2003 | Andrews et al. | |
| 2004/0235488 A1* | 11/2004 | Choi | H04L 12/5693 455/452.2 |

(Continued)

FOREIGN PATENT DOCUMENTS

WO 2005040959 A2 5/2005

OTHER PUBLICATIONS

Extended European Search Report for EP Application No. 15166412.5-1857, dated Sep. 18, 2015, pp. 1-7.

*Primary Examiner* — Andrew Lai
*Assistant Examiner* — Leon Andrews
(74) *Attorney, Agent, or Firm* — Cantor Colburn LLP (57) ABSTRACT

A system and method to implement a scheduling algorithm in a communication network using time division multiple access (TDMA) are described. The system includes a plurality of devices, each device transmitting a packet of data in the communication network, and a memory device to store the scheduling algorithm. The system also includes a processor to execute the scheduling algorithm to form a deterministic packet scheduling scheme, the deterministic packet scheduling scheme being based on a base unit representing a minimum among maximum packet intervals corresponding to the plurality of devices in the communication network.

15 Claims, 6 Drawing Sheets

(56) References Cited

U.S. PATENT DOCUMENTS

2005/0036466 A1* 2/2005 Malik ................ H04L 12/5695
370/338
2007/0019594 A1   1/2007 Perumal et al.
2009/0116438 A1* 5/2009 Madan ............... H04L 12/5695
370/329

* cited by examiner

DETERMINISTIC SCHEDULING ALGORITHM FOR WIRELESS COMMUNICATION

BACKGROUND OF THE INVENTION

Exemplary embodiments pertain to the art of wireless communication.

Many systems include components or devices that must communicate with each other or a central controller, and, in many cases, that communication is wireless. Typically, contention-based protocols such as IEEE 802.15.11 and 802.15.4 are used to organize and prioritize the communication among the devices. These protocols provide random or non-deterministic access to radio frequency (RF) channels. As a result, a real-time stream of data may not be guaranteed. Other protocols (including IEEE 802.15.4) have contention-free mechanisms such as guaranteed time slot (GTS). GTS requires knowledge of the bandwidth requirement and limits the number of devices that may use GTS.

BRIEF DESCRIPTION OF THE INVENTION

Disclosed is a system to implement a scheduling algorithm in a communication network using time division multiple access (TDMA) including a plurality of devices, each device transmitting a packet of data in the communication network; a memory device configured to store the scheduling algorithm; and a processor configured to execute the scheduling algorithm to form a deterministic packet scheduling scheme, the deterministic packet scheduling scheme being based on a base unit representing a minimum among maximum packet intervals corresponding to the plurality of devices in the communication network.

Also disclosed is a computer-implemented method of executing a deterministic scheduling algorithm in a communication network using time division multiple access (TDMA) including determining a maximum packet interval (MPI) for each device among a plurality of devices of the communication network; determining a base unit (BU) as a minimum MPI among the MPIs of the plurality of devices; and executing, using a processor, the deterministic scheduling algorithm based on the BU.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

As noted above, devices within a system may implement wireless communication with each other or a central controller. Embodiments discussed herein specifically reference an avionic system for explanatory purposes, but the systems and methods discussed herein are not limited to any particular application. In the exemplary avionic system, wireless sensors and actuators may be among the devices that communicate wirelessly. Avionic systems must meet communication regulations and involve mission critical data that is not conducive to the contention-based protocols typically used in wireless communication systems. In avionic communication, each of the various devices must communicate with a central controller in a designated timeslot. Embodiments of the systems and methods described herein relate to a deterministic packet scheduling scheme for time division multiple access (TDMA) communication by devices in an exemplary aviation system.

Figure 1:
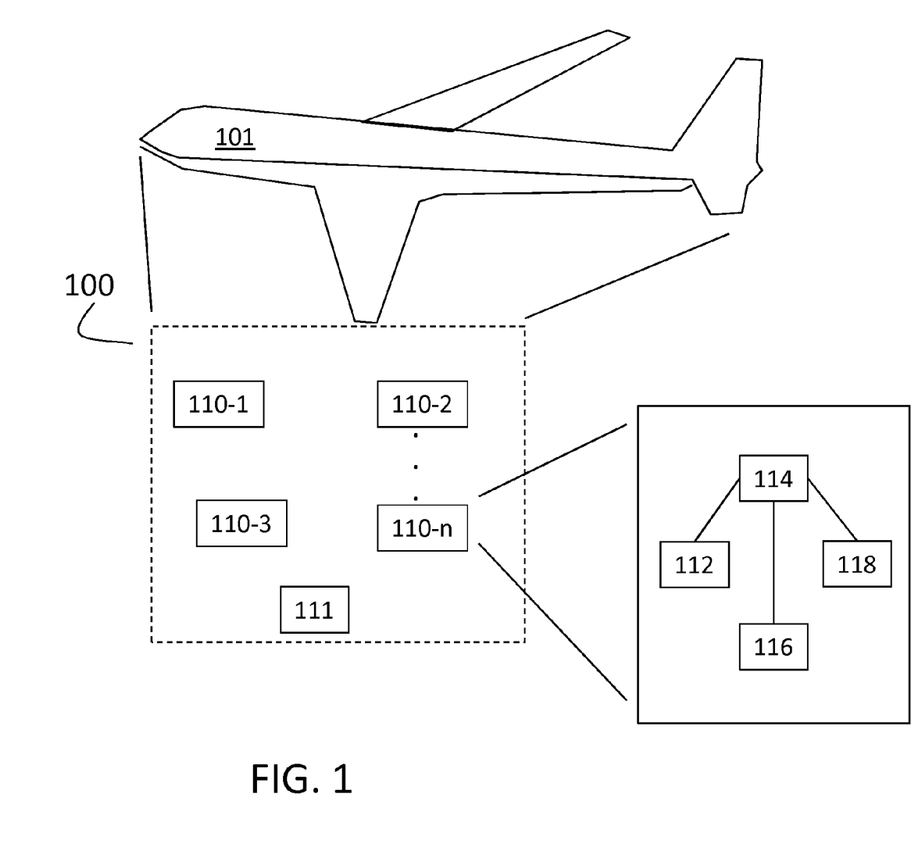
FIG. 1 is a block diagram of an exemplary system implementing wireless communication according to embodiments of the invention.

FIG. 1 is a block diagram of an exemplary system 100 implementing wireless communication according to embodiments of the invention. The exemplary system 100 is an avionic system on an airplane 101 and includes any number of devices 110-1 through 110-$n$ (referred to generally as 110). The system 100 also includes a central controller 111 to which communication from each of the devices 110 is sent according to the communication scheme discussed below. The devices 110 may include sensors, actuators, and other types of devices that send and/or receive data. One or more of the devices 110 may include an input interface 112, one or more processors 114, one or more memory devices 116, and an output interface 118. One of the devices 110 may be a controller that provides instructions regarding the communication scheme to the other devices 110. Alternatively, the controller that provides instructions regarding communication to all the devices 110 of the system 100 may not be part of the system 100 itself but may include the input interface 112, one or more processors 114, one or more memory devices 116, and an output interface 118. The memory device 116 may be a computer-readable memory device that causes the processor 114 to execute instructions stored in the memory device 116 when processed. The functions and processes performed by the controller to determine the communication scheme are detailed below.

Figure 2:
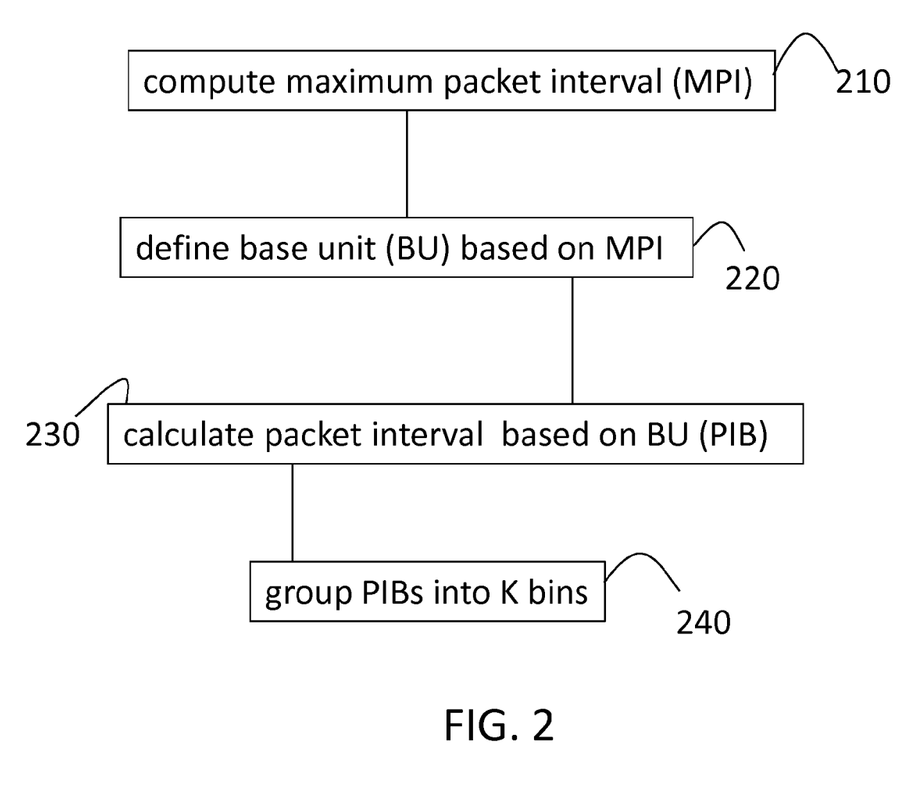
FIG. 2 is a process flow of a method of developing a packets round (PR) according to embodiments of the invention.

FIG. 2 is a process flow of a method of developing a packets round (PR) 410 (FIG. 4) according to embodiments of the invention. Each device 110 has an associated peak data rate ($R_p$) and a maximum latency ($T_{lag}$). The $R_p$ defines the maximum amount of packets (information in bytes) that can be moved in a unit of time, and $T_{lag}$ describes the largest time gap allowed between two adjacent packets from the given device 110. Any communication scheme should meet these two requirements for each device 110. At block 210, computing the maximum packet interval (MPI), the maximum allowable distance between two adjacent packets from a given device 110, is as follows:

$$MPI = \left[\arg\min\left\{\frac{R_{pkt}}{R_p}, \frac{T_{lag}}{T_{pkt}}\right\}\right] \qquad [\text{EQ. 1}]$$

The floor function (indicated by ⌊ ⌋) rounds MPI to the closest integer (greater than one) toward negative infinity (the smallest integer value greater than one) and computes MPI for each device 110 based on the $R_p$ and $T_{lag}$ of the device 110. $T_{pkt}$ is assumed to be a constant and represents the time required, with all overheads included, to transmit $L_{payload}$ bytes, which is also assumed as a constant. $R_{pkt}$ is given by:

$$R_{pkt} = \frac{R_{phy} * T_{payload}}{T_{pkt}} \quad [\text{EQ. 2}]$$

$R_{phy}$ is the raw data rate in the physical layer and $T_{payload}$ is the amount of time required to transmit $L_{payload}$ bytes (without considering overheads). While MPI is dimensionless, it expresses a distance with reference to number of packets based on the implied discretization in a packetized network. The MPI of a given device 110 sets an upper limit for access sharing with other devices 110 in the same system 100 (network). The use of MPI imposes a tighter boundary on bandwidth requirements than the use of the $R_p$ and $T_{lag}$, because the implied data rate is higher than $R_p$ or the implied latency is lower than $T_{lag}$ or both.

At block 220, defining a base unit (BU) based on the MPI obtained for each device 110 using EQ. 1. BU is defined as the minimum MPI among the MPIs of the different devices 110:

$$BU = \arg\min_{m \in 1 \ldots M} \{MPI_m\} \quad [\text{EQ. 3}]$$

Figure 4:
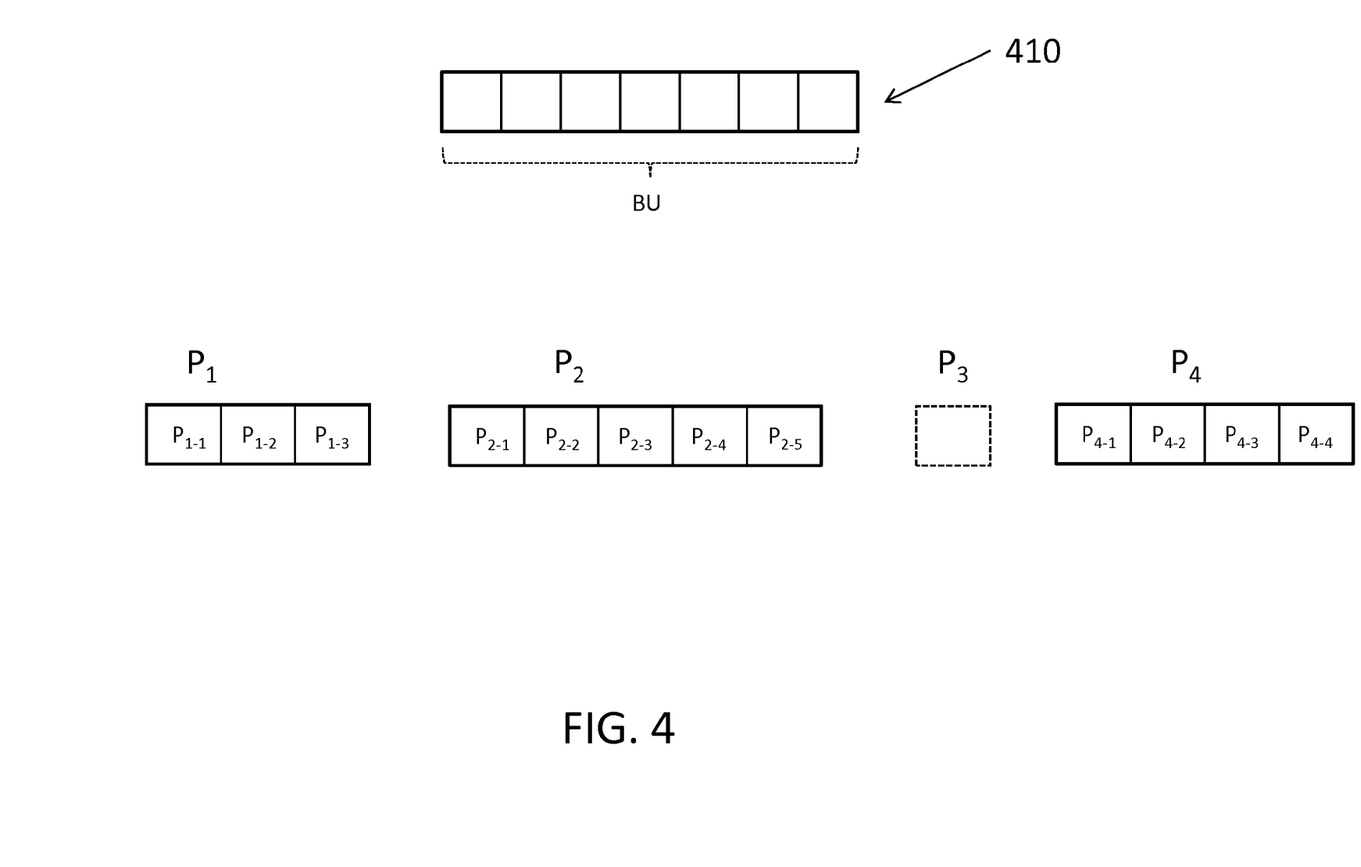
FIG. 4 illustrates an exemplary BU and $P_k$ according to embodiments of the invention.

M is the number of devices 110 in the network of the system 100. The use of the BU ensures that the resulting PR 410 satisfies the most restrictive bandwidth requirement among the devices 110 of the system 100. This is because the minimum MPI represents the smallest among the maximum allowable distances between two adjacent packets. As such, the BU represents a quantitative measure of how many additional packets may be accommodated once the most demanding communication has been met. At block 230, calculating a packet interval based on BU, referred to as PIB, for each device 110 is as follows:

$$PIB_m = \left\lfloor \log_2 \frac{MPI_m}{BU} \right\rfloor \quad [\text{EQ. 4}]$$

Every PIB is an integer number larger than one and satisfies $PIB_m * BU \leq MPI_m$. Every device 110 has a PIB associated with it, but two or more devices 110 may have the same PIB. By using the PIB, the length of a PR 410 can be increased easily. This is because the PR 410 may be doubled and duplicated (thereby doubling free or unoccupied packet spaces) without changing the packet arrangement within the PR 410. For example, if the current length for a packets round 410 is 2 BUs with 3 unoccupied packet spaces, then the number of unoccupied packet spaces can be doubled (to 6) by cloning the current PR 410 without changing the packet arrangement.

At block 240, grouping PIBs into K bins includes grouping PIBs by values into K bins such that:

$$K = \arg\max_{m \in 1 \ldots M} \{PIB_m\} \quad [\text{EQ. 5}]$$

The kth bin has $P_k$ number of PIBs (number of devices 110 with same PIB) with identical values, also equal to the bin's index k, such that:

$$P_k = \text{count}(PIB_m \equiv k) \quad [\text{EQ. 6}]$$

The symbol indicates "is the same as." m is the set of devices 110 (m∈1 . . . M) and k is the bins (k∈1 . . . K) and $$\sum_{k \in 1 \ldots K} P_k \equiv M \quad [\text{EQ. 7}]$$

As a PR 410 grows (e.g., by doubling) the PR 410 may be considered as including $2^N$ BUs, where N is a measure of the size of PRs 410. With all the above-noted values in place, the PR 410 may be constructed as discussed with reference to FIG. 3 below.

Figure 3:
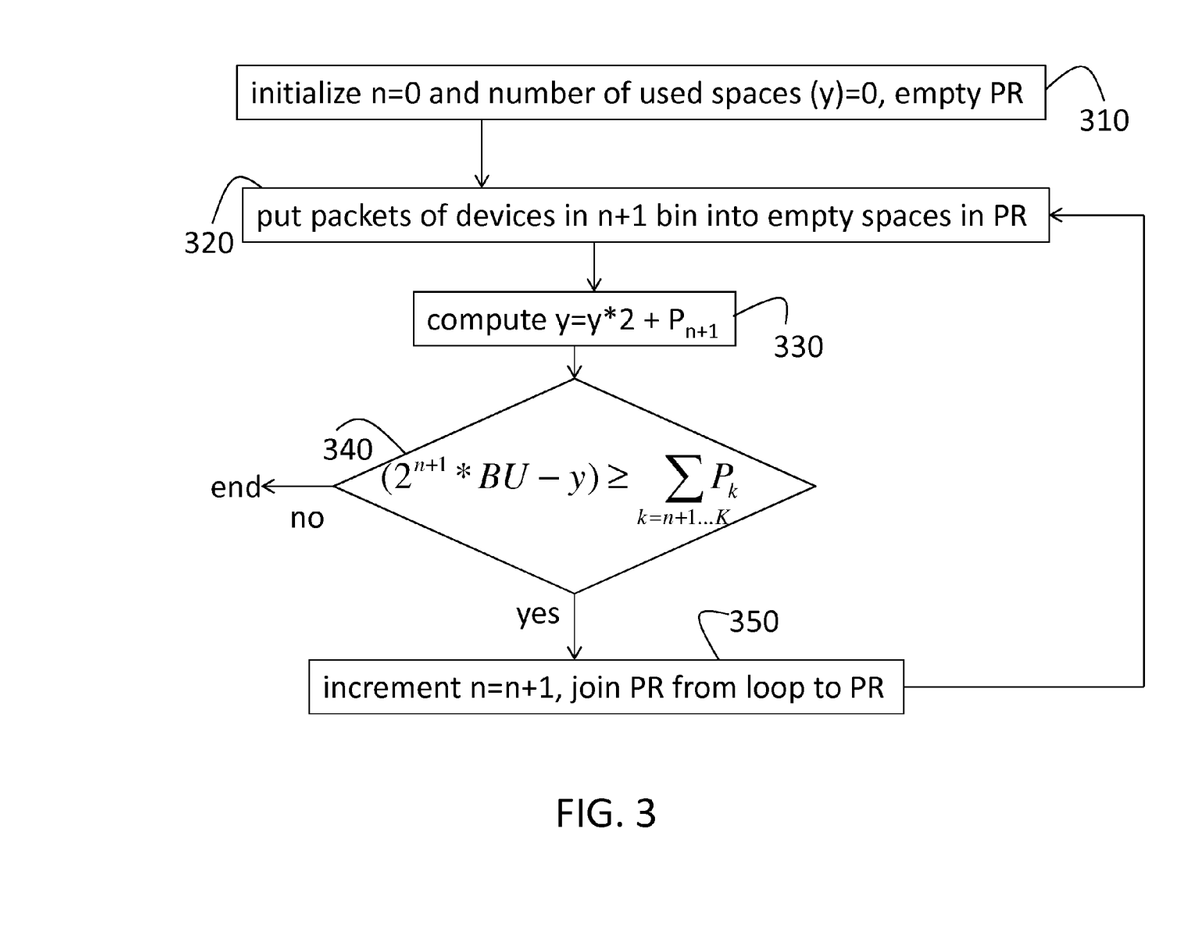
FIG. 3 is a process flow of a method of constructing a PR according to an embodiment of the invention.

FIG. 3 is a process flow of a method of constructing a PR 410 (FIG. 4) according to an embodiment of the invention. At block 310, initializing includes setting n=0, number of used spaces (y)=0, and starting with an empty list for the PR 410. At block 320, the process includes putting packets of devices 110 in the n+1 bin into empty spaces in the PR 410 includes. For example, the first time through the loop, with n initialized to 0, packets of all of the devices 110 in the $1^{st}$ bin (0+1 bin) are put into the PR 410, which has all spaces empty at this point. At block 330, computing the number of used spaces y is given by:

$$y = y*2 + P_{n+1} \quad [\text{EQ. 8}]$$

Thus, for example, when n=0 and y=0 in the first iteration, the number of used spaces y is P1 or the number of devices 110 in bin 1. At block 340, a check is performed as follows:

$$(2^{n+1} * BU - y) \geq \sum_{k=n+1 \ldots K} P_k \quad [\text{EQ. 9}]$$

The comparison in EQ. 9 is between the number of unoccupied spaces (total spaces minus the used spaces y on the left) and a summation of the number of devices 110 in the remaining bins (on the right). When the number of unoccupied spaces is less than the number of devices 110 in the remaining bins, then the process ends because there is insufficient bandwidth. When the number of unoccupied spaces is greater than or equal to the number of devices 110 in the remaining bins, then the process proceeds to block 350. At block 350, incrementing n by 1 and joining the PR 410 from the current loop with the existing PR 410 (which is null for the first iteration) is followed by returning the process to block 320. In the case of insufficient bandwidth, the initial PR 410 may be doubled, as discussed above, to double the number of unoccupied spaces and repeat the processes shown in FIG. 3 until a PR 410 accommodating packets from all the devices 110 is developed. In alternate embodiments, the final PR 410 additionally accommodates (sets aside a few packet spaces for) a new device 110 to sense the central controller 111 and join the communication scheme of the network of devices 110. The additional packets in the PR 410 are achieved according to two different embodiments. According to one embodiment, unoccupied spaces remaining after all of the devices 110 are accommodated may be used. According to another embodiment, a virtual device 110 may be used in the development of the PR 410 to increase the size of one of the bins (in Eq. 6) and ensure that space is available for a new device 110.

To address bandwidth requirements, the following inequality may be used to check whether a PR 410 may be deterministically arranged for a given set of $P_k$ if $P_k>0$ for all $P_k$ (every bin has at least one device 110):

$$2^N * BU \geq \sum_{k=1...K} (2^{N+1-k} * P_k) \qquad \text{[EQ. 10]}$$

or $$BU \geq \sum_{k=1...K} (2^{1-k} * P_k) \qquad \text{[EQ. 11]}$$

A more generalized form of establishing the bandwidth boundary may be written as:

$$2^N * BU \geq \sum_{k=1...K} (2^{T_k} * P_k) \qquad \text{[EQ. 12]}$$

$T_k = f(T_k - 1)$ and $T_k = N - (k-1)$ if $P_k > 0$ for all $k=1 \ldots K$. As a result, if block 320 is removed from the iterative process shown in FIG. 3, the feasibility or length of the PR 410 may be determined rather than or before determining the PR 410 itself.

Figure 5:
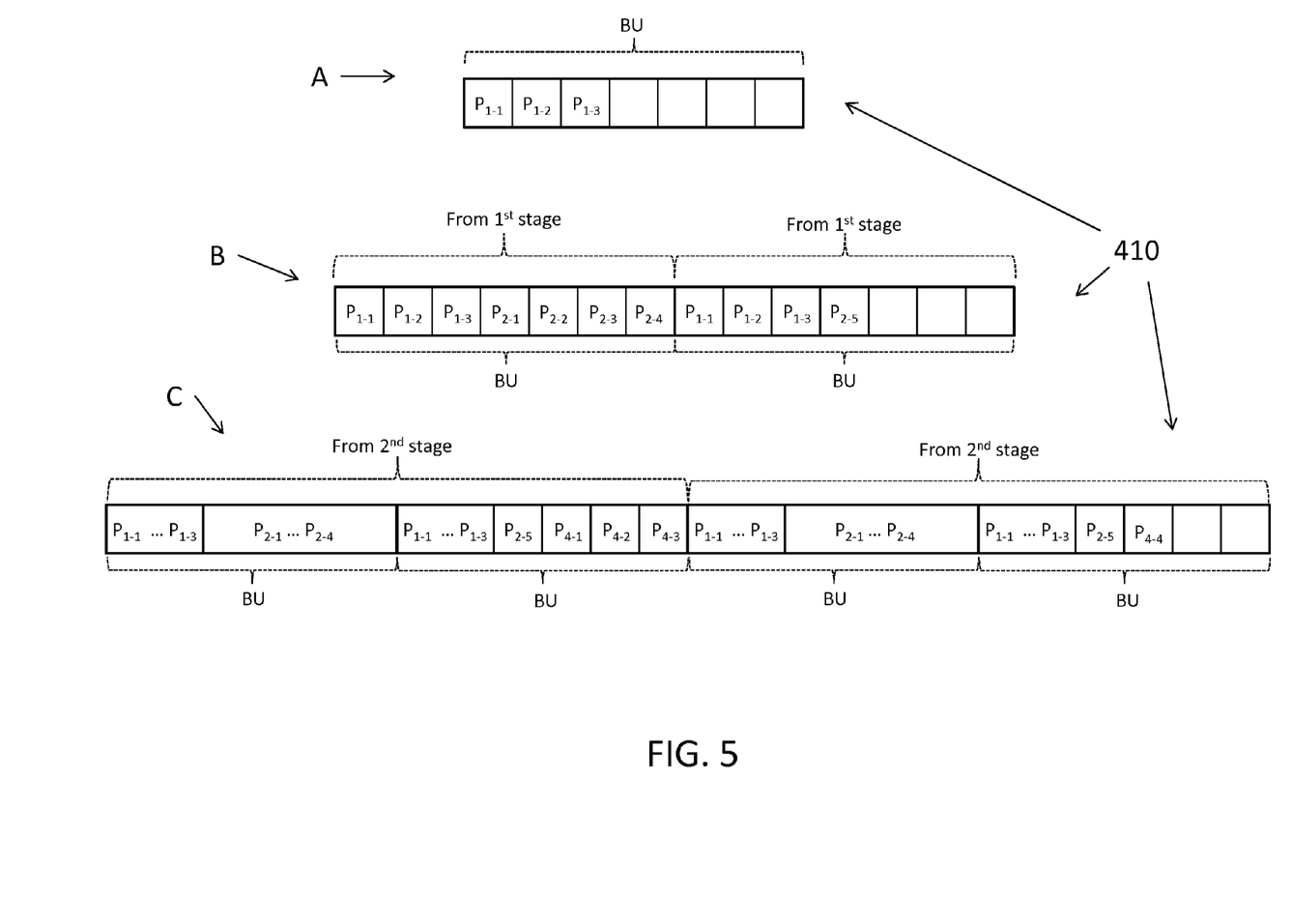
FIG. 5 illustrates the development of an exemplary PR according to an embodiment of the invention.

FIGS. 4 and 5 are used to illustrate the development of an exemplary PR 410 as described above. FIG. 4 illustrates an exemplary BU and $P_k$ according to embodiments of the invention. BU is 7 and k is 4 (e.g., there are 4 bins) according to the example. The illustration of BU can be thought of as illustrating the result of block 310 (the initialized PR 410). Also in the example, M (total number of devices 110) is 12, and the breakdown of the devices 110 into the four bins (according to PIB of each device 110) is as follows: there are three devices 110 ($P_{1-1}$, $P_{1-2}$, $P_{1-3}$) in the first bin; there are five devices 110 ($P_{2-1}$, $P_{2-2}$, $P_{2-3}$, $P_{2-4}$, $P_{2-5}$) in the second bin; there are no devices 110 in the third bin; and there are four devices 110 ($P_{4-1}$, $P_{4-2}$, $P_{4-3}$, $P_{4-4}$) in the fourth bin. The four bins and their respective devices are indicated in FIG. 4.

FIG. 5 illustrates the development of an exemplary PR 410 according to an embodiment of the invention. Three different stages, A, B, and C are illustrated for explanatory purposes, but fewer or more stages may be required to develop PR 410 in other cases with other devices 110. In the first stage A, the packets of devices 110 in the first bin (n+1=1) are put into the empty spaces of the initialized PR 410, as discussed with reference to block 320. According to EQ. 8, the number of used spaces y is three. At this stage, according to EQ. 9, 11>9 is true such that the process of developing the PR 410 may continue as described with reference to FIG. 3. By incrementing n by 1, stage B is reached, and the devices 110 in the second bin are placed in the PR 410 as shown in FIG. 5. Once again, EQ. 8 and EQ. 9 are used to determine the number of used spaces and to verify that enough unoccupied spaces are available to place packets from the remaining devices 110. Stage C is reached after the devices from the fourth and final bin are placed. As FIG. 5 illustrates, unused spaces also remain in the final PR 410 at stage C.

Figure 6:
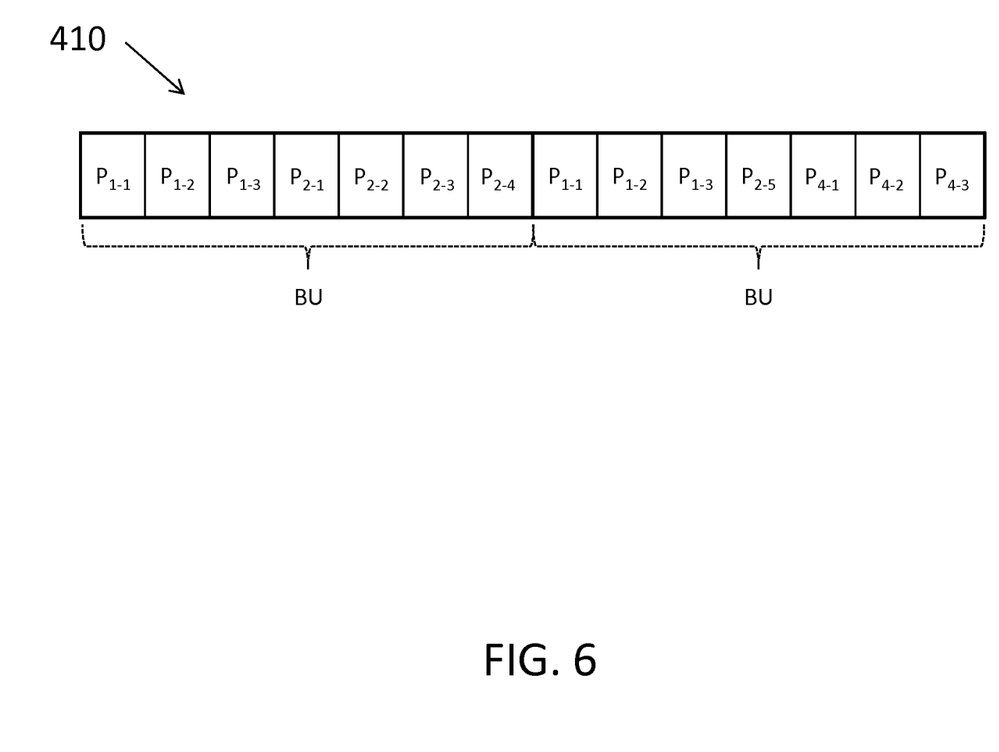
FIG. 6 shows another exemplary PR according to embodiments of the invention.

FIG. 6 shows another exemplary PR 410 according to embodiments of the invention. According to the example illustrated in FIG. 6, the different from the previous example is that the total number of devices M is eleven rather than twelve (there are three rather than four devices 110 ($P_{4-1}$, $P_{4-2}$, $P_{4-3}$) in the fourth bin). As a result, only two stages or iterations (length of two BU) are needed to accommodate all the devices 110 into the PR 410. In addition, according to the embodiment illustrated in FIG. 6, there are no unoccupied spaces remaining that may be used by a new device 110 to join the network of the system 100 and communicate with the central controller 111.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system to implement a scheduling algorithm in a communication network using time division multiple access (TDMA), the system comprising:
    a plurality of devices, each device transmitting a packet of data in the communication network;
    a memory device configured to store the scheduling algorithm; and
    a processor configured to execute the scheduling algorithm to form a deterministic packet scheduling scheme, the deterministic packet scheduling scheme being based on a base unit (BU) representing a minimum among maximum packet intervals (MPI) corresponding to the plurality of devices in the communication network.

2. The system according to claim 1, wherein the processor is further configured to determine a packet interval based on the base unit (PIB) for each of the plurality of devices.

3. The system according to claim 2, wherein the processor determines the PIB for each of the plurality of devices, indicated by m, using a floor function as:

$$PIB_m = \left\lfloor \log_2 \frac{MPI_m}{BU} \right\rfloor.$$

4. The system according to claim 2, wherein the processor groups devices among the plurality of devices that have a same PIB into a same bin among a plurality of bins.

5. The system according to claim 4, wherein the processor executes the scheduling algorithm in iterations, with one iteration for each of the plurality of bins, based on scheduling the packets associated with the devices in one of the plurality of bins in each of the iterations.

6. The system according to claim 1, wherein the processor is further configured to execute the scheduling algorithm iteratively, and verify bandwidth sufficiency at each iteration based on comparing a number of unused slots and a number of the plurality of devices remaining to be scheduled.

7. The system according to claim 6, wherein the processor verifies the bandwidth sufficiency based on determining whether:

$$(2^{n+1} * BU - y) \geq \sum_{k=n+1\ldots K} P_k,$$

where n is a initialized to 0, y is a number of used slots, and $P_k$ is a number of the plurality of devices in each of K bins.

8. A computer-implemented method of executing a deterministic scheduling algorithm in a communication network using time division multiple access (TDMA), the method comprising:

determining a maximum packet interval (MPI) for each device among a plurality of devices of the communication network;

determining a base unit (BU) as a minimum MPI among the MPIs of the plurality of devices; and executing iteratively, using a processor, the deterministic scheduling algorithm based on the BU.

9. The computer-implemented method according to claim 8, further comprising determining a packet interval based on the BU (PIB) for each of the plurality of devices.

10. The computer-implemented method according to claim 9, wherein the determining the PIB for each of the plurality of devices, indicated by m, includes using a floor function as:

$$PIB_m = \left\lfloor \log_2 \frac{MPI_m}{BU} \right\rfloor.$$

11. The computer-implemented method according to claim 9, further comprising sorting the plurality of devices into bins based on the respective PIB, wherein a device among the plurality of devices with a given PIB is sorted into a same bin as another device among the plurality of devices with the given PIB.

12. The computer-implemented method according to claim 11, wherein the executing the deterministic scheduling algorithm includes scheduling packets associated with the plurality of devices in an order corresponding to the respective bins.

13. The computer-implemented method according to claim 8, further comprising verifying bandwidth sufficiency at each iteration of the deterministic scheduling algorithm.

14. The computer-implemented method according to claim 13, wherein the verifying includes comparing a number of unused slots and a number of the plurality of devices remaining to be scheduled.

15. The computer-implemented method according to claim 14, wherein the verifying includes determining whether:

$$(2^{n+1} * BU - y) \geq \sum_{k=n+1\ldots K} P_k$$

where n is a initialized to 0, y is a number of used slots, and $P_k$ is a number of the plurality of devices in each of K bins.

* * * * *